April 8, 1958

J. J. PARKER ET AL 2,829,897

CHUCK FOR THREADED ARTICLES

Filed March 13, 1957

INVENTORS
JOHN J. PARKER &
LONDON T. MORAWSKI
BY

ATTORNEYS

United States Patent Office 2,829,897
Patented Apr. 8, 1958

2,829,897
CHUCK FOR THREADED ARTICLES

John J. Parker and London T. Morawski, Detroit, Mich.

Application March 13, 1957, Serial No. 645,702

12 Claims. (Cl. 279—2)

This invention relates to chucks and more particularly to chucks of the type which are especially designed to hold a series of identical threaded parts by engagement with a threaded surface thereon.

One problem which exists in the chucking of threaded parts centers around the difficulty of holding close tolerances of concentricity, while allowing a reasonable tolerance on the diameter of the thread which can be accommodated. That is to say, a piece which has been machined with a thread thereon and which is to be subsequently machined to form another surface concentric with the thread, presents difficulties in holding a close concentricity tolerance without holding even closer limits on the dimensional tolerances of the thread which can be accommodated.

Another problem which arises in the chucking of threaded parts involves the time required to thread the part on and off from a threaded chuck or work holding device. With devices of the prior art, the choice lies either with a chuck which has a substantially full length thread and is thus time consuming in applying and removing the part, or else with a collapsible and expandable chuck in which the part may be slipped over the threads, after which the chuck jaws are extended into engagement with the threaded part. The latter construction involves difficulties in manually aligning the part so that when the chuck jaws are extended, they do not ride on the tips of the thread and jam, or become cross-threaded.

It is an object of the present invention to provide an improved chuck for holding threaded work pieces wherein close limits of concentricity may be maintained without requiring close limits dimensionally of the thread formations on successive work pieces.

It is another object of this invention to provide a chuck for holding threaded work pieces in which means are provided for guiding the work piece initially into its approximate final position without requiring the time consuming operation of threading the piece the full length of its thread.

Another object is to provide a chuck of this class in which work pieces may be quickly applied and removed.

A further object is to provide, in a chuck of the character described, a resilient frictional means for enabling an operator to detect by feel when the work piece has been brought to its proper position.

Further objects and advantages of the present invention will be apparent from the following description, reference being made to the accompanying drawing wherein a preferred form of the present invention is illustrated.

Figure 1:
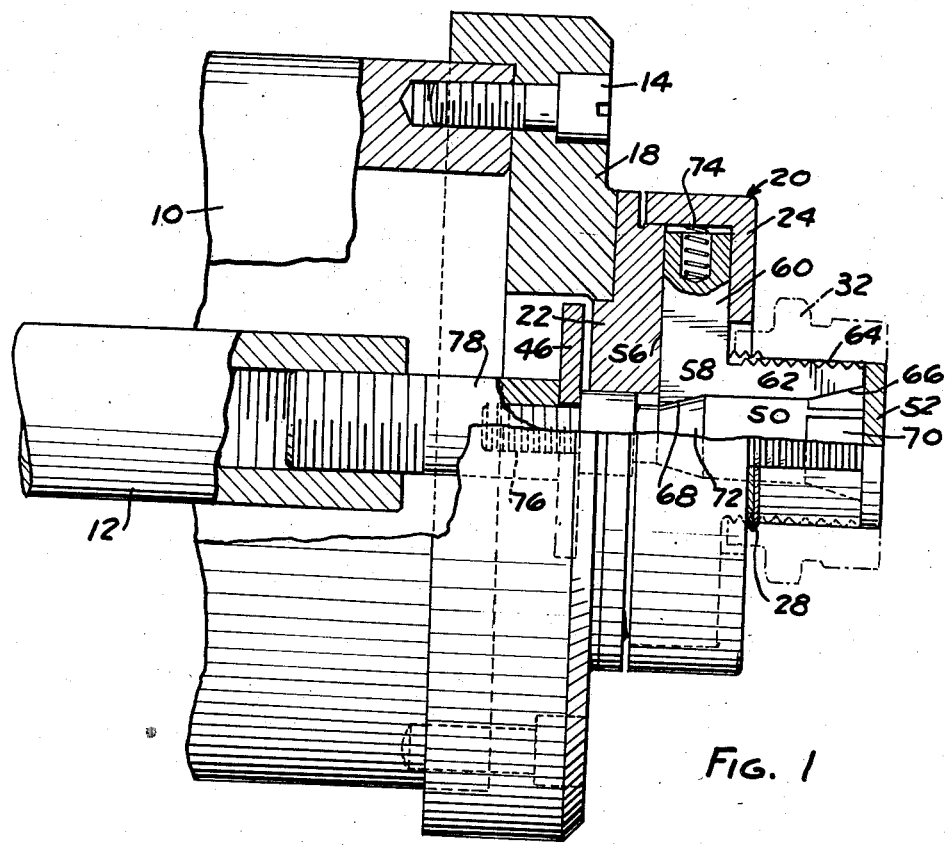
Fig. 1 is a side view partly in section showing a chuck incorporating a preferred form of the present invention.
Figure 2:
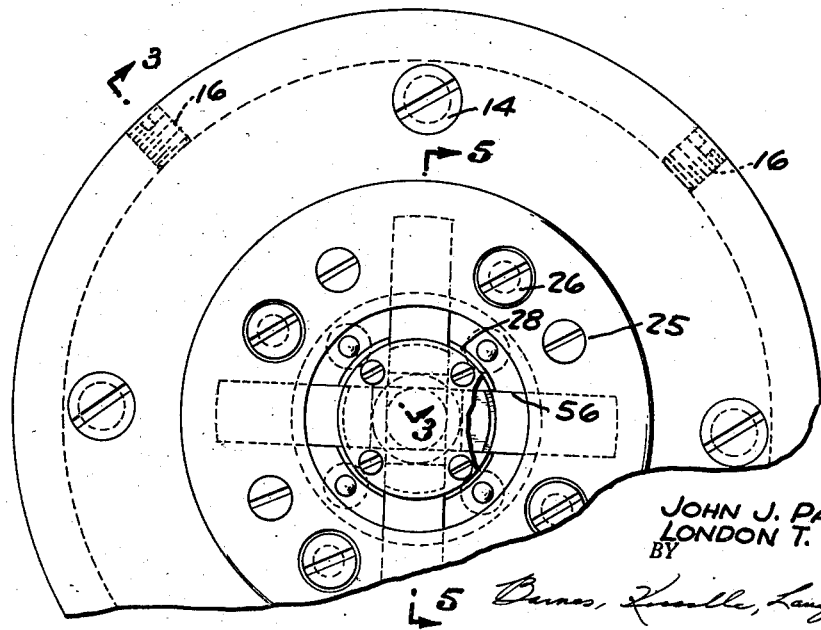
Fig. 2 is a right hand end view of the chuck illustrated in Fig. 1.

Referring now to Figs. 1 and 2, there is shown a support 10 which may constitute a machine tool spindle and a chuck actuator rod 12 which is reciprocable to the right and left to retract and extend the jaws of a chuck. Secured to the end of the support 10 by cap screws 14, and set screws 16, is a face plate 18 which carries a chuck body generally designated 20 and which comprises a base 22 and a cover 24 secured thereto by screws 25, Fig. 2.

Figure 3:
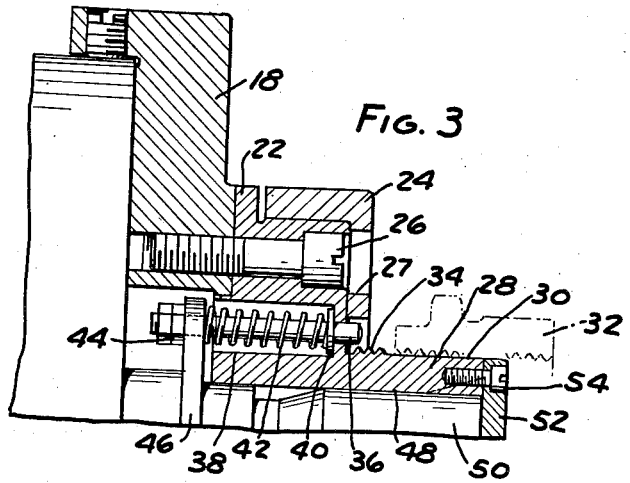
Fig. 3 is a fragmentary sectional view taken on line 3—3 of Fig. 2, showing a preliminary phase of positioning a work piece upon the chuck.
Figure 4:
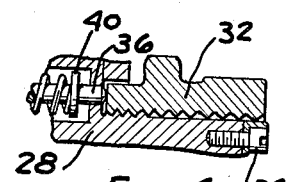
Fig. 4 is a fragmentary view corresponding to Fig. 3 showing a work piece in a second position.

The construction of the base 22 is best seen in Fig. 3 from which it will be seen that it is secured to the face plate 18 by cap screws 26, which are accessible through holes 27 in the cover 24. The base 22 has a generally cylindrical projection 28 which forms a guide surface that is rigidly positioned in the sense that it is not expandable or collapsible. The front section 30 of the guide 28 is cylindrical in form and of a diameter to loosely engage the threads of a work piece 32, so that the latter may be freely slipped over the front section 30 of the guide 28. The rear section 34 of the guide 28 has a few turns of a thread which also loosely fits the work piece 32.

A series of resiliently loaded pins 36 are mounted in bores 38 in the base member 22 and project to the right into a position overlying the rear guide section 34 as shown in Fig. 3. The pins 36 carry integral shoulders 40 for abutting against the right end of springs 42. At their left end, the pins carry lock nuts 44 upon the left hand side of a retracting plate 46, through which the pins extend with a loose-sliding fit.

Mounted within a bore 48 in the base 22 is a cam bar 50. The right end of the bore 48 is closed by a cover plate 52 secured by screws 54.

Referring again to Figs. 1 and 2, the base 22 is provided with a suitable number, in this case 4, of radially extending slots 56, which extend through the guide 28, interrupting its circumference as seen in Fig. 2. Within the slots 56 are mounted a corresponding number of work engaging jaws 58. Each jaw is provided with a radially extending guide portion 60 and an axially extending work engaging portion 62. The latter is provided with serrations 64 which are formed to engage the threads of the work piece 32 when the jaws are extended.

At each end of the work engaging portion 62, there is provided an inclined or conical cam-follower surface 66 and 68. These are formed to co-operate with conical camming surfaces 70 and 72 formed on the cam bar 50. Retraction springs 74 are provided at the outer end of the radial guide portion 60 of the jaws 58. It will be understood that while the expression "cam means" as utilized hereafter, refers to the complete mechanism for moving the jaws inwardly and outwardly which, in this embodiment, is both the cams 70 and 72 and the retracting springs 74, other types of equivalent camming mechanisms may be utilized for this purpose.

The cam bar 50 has a threaded section 76 at its left hand end upon which is threaded a coupling member 78, which also serves to clamp the pin retracting plate 46 in position. The left hand end of coupling 78 is threaded into the actuator bar 12.

In operation, with the actuator bar 12 in its right hand or jaw-retracting position shown in Figs. 1 and 3, the jaws 58 have their serrations 64 retracted inwardly so that the tips of the threads do not extend radially beyond the front guide section 30. A work piece may then be manually slipped over the front guide section and rotated to thread it onto the rear guide section 34. As soon as thread engagement of a turn or so has been accomplished, the end of the work piece contacts the friction pins 36 which create a light resistance to further turning of the work piece and thus inform the operator through the sense of touch that the work piece has been sufficiently engaged.

Thereupon, the operator may release the work piece and cause the actuator bar to be shifted to the left, preferably utilizing a fluid-operated or spring biased mechanism for this purpose. This pulls the cams 70 and 72 to the left and drives the jaws 58 outwardly so that the serrations 64 tightly engage in the threads of the work piece. The phasing, as to lead, of the threads 34 and the serrations 64 is coordinated so that this engagement is automatically assured.

There is sufficient stroke of the jaws 58 so that the maximum tolerance limit of thread dimension on the work piece still leaves a little additional available stroke of the jaws 58 under the action of cam bar 50. Thus, the work piece is tightly engaged upon the jaws 50.

Because of the loose fit of the front and rear sections of guide 28, there is no contact of the work piece therewith and the part is thus held centrally to whatever degree of accuracy is built into the cam bar 50, the jaws 58 and their respective supporting surfaces. For this purpose, these parts are machined with high accuracy. Due to the use of the two separate cams 70 and 72 acting upon the surfaces 66 and 68 at the very ends of the jaws, the movement of the latter radially is produced with highly accurate control as to squareness, with the plane of the face plate 18.

It will thus be seen that the present invention provides an improved chuck for holding threaded pieces concentrically in which the concentricity tolerance does not depend upon the dimensional tolerance of the threads of the work piece and which further enables successive pieces to be mounted and dismounted manually with ease and rapidity.

Figure 5:
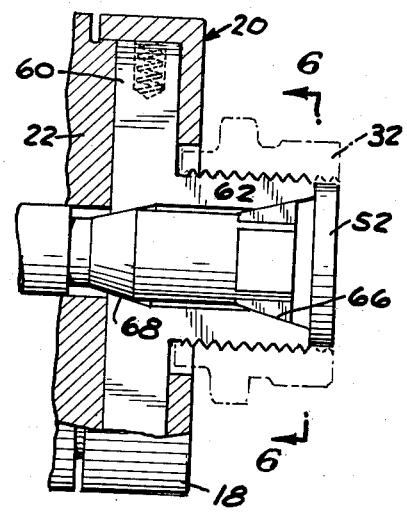
Fig. 5 is a fragmentary sectional view taken on line 5—5 of Fig. 2.
Figure 6:
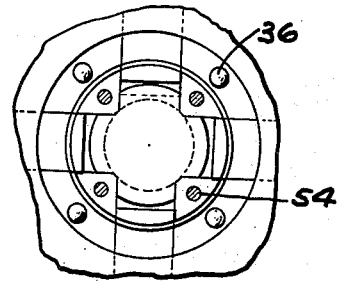
Fig. 6 is a fragmentary sectional view taken on line 6—6 of Fig. 5.

In the embodiment illustrated, the chuck is designed for holding internally threaded parts. That the invention may be readily incorporated in a chuck for holding externally threaded parts will be evident if the representation in Fig. 5, for example, be cut in two at the center line and the top and bottom halves be transposed.

While the form of embodiment of the invention as herein described constitutes a preferred form, it is to be understood that other forms might be adopted, all coming within the scope of the claims which follow.

What is claimed is as follows:

1. A chuck for holding a work piece having a threaded surface comprising a body having a first threaded portion of short axial length which is noncollapsible and divided into a plurality of spaced segmented sections, a plurality of radially shiftable jaws mounted for motion in the space between said segments and having serrated work-engaging surfaces which together form a second threaded portion which is collapsible, and cam means for expanding and collapsing the jaws.

2. A chuck for holding a work-piece having a threaded surface comprising a body having a first threaded portion of short axial length which is noncollapsible and divided into a plurality of spaced segmented sections, means on the body forming a segmentally interrupted cylindrical portion adjacent to and coaxial with the first threaded portion and having a diameter approximating the thread root diameter of the first portion, a plurality of radially shiftable jaws mounted for motion in the space between said segments and having serrated work-engaging surfaces which together form a second threaded portion which is collapsible, and cam means for expanding and collapsing the jaws.

3. A chuck for holding a work-piece having a threaded surface comprising a body having a first threaded portion of short axial length which is noncollapsible and divided into a plurality of spaced segmented sections, a plurality of radially shiftable jaws mounted for motion in the space between said segments and having serrated work-engaging surfaces which together form a second threaded portion which is collapsible, each jaw having a radially extending base portion, a guide slot in the body for each base, and cam means for expanding and collapsing the jaws.

4. A chuck for holding a work-piece having a threaded surface comprising a body having a first threaded portion of short axial length which is noncollapsible and divided into a plurality of spaced segmented sections, a plurality of radially shiftable jaws mounted for motion in the space between said segments and having serrated work-engaging surfaces which together form a second threaded portion which is collapsible, each jaw having a radially extending base portion, a guide slot in the body for each base, and cam means for expanding and collapsing the jaws, said cam means comprising a pair of conically arranged cam surfaces spaced axially and acting adjacent to the ends of the work-engaging portions of the jaws.

5. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece.

6. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, both said guide sections being substantially undersized with respect to the threads of the work-piece, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece.

7. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece, and resilient means for frictionally contacting the work-piece after it has engaged upon the rear section of the guide.

8. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, both said guide sections being substantially undersized with respect to the threads of the work-piece, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece, and resilient means for frictionally contacting the work-piece after it has engaged upon the rear section of the guide.

9. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece, resilient means for frictionally contacting the work-piece after it has engaged upon the rear section of the guide, and means operable when the jaws are extended for retracting the resilient means from contacting the work piece.

10. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece, and an axially slideable pin positioned to yieldably contact the work-piece as it is threaded onto the rear section.

11. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, both said guide sections being substantially undersized with respect to the threads of the work-piece, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece, and an axially slideable pin positioned to yieldably contact the work-piece as it is threaded onto the rear section.

12. A chuck for holding a threaded work-piece comprising means forming a series of circumferentially spaced and rigidly positioned guides, each guide having a front section which is cylindrical and sized to slideably fit the threaded part of the work-piece and a rear section having serrations which together form a thread of short axial length, means forming a series of radially expandable and collapsible jaws circumferentially interfitted between the guides and having serrations to form together a work-engaging thread substantially coextensive axially with the guides and cam means for shifting the jaws whereby a threaded part may be manually slipped over the front section of the guides while the jaws are retracted, may then be threaded onto the rear section of the guides while the jaws are retracted and may be held and centered independently of the guide by extending the jaws into engagement with the threads of the work-piece, an axially slideable pin positioned to yieldably contact the work-piece as it is threaded onto the rear section, and means operable when the jaws are extended for retracting the pin.

References Cited in the file of this patent

UNITED STATES PATENTS

| 2,232,304 | Baker | Feb. 18, 1941 |
| 2,675,241 | Petit | Apr. 13, 1954 |